(12) United States Patent
Poick et al.

(10) Patent No.: US 11,725,533 B2
(45) Date of Patent: Aug. 15, 2023

(54) VARIABLE GUIDE VANE ASSEMBLY AND BUSHING RING THEREFOR

(71) Applicant: PRATT & WHITNEY CANADA CORP., Longueuil (CA)

(72) Inventors: Daniel Poick, Brampton (CA); Tibor Urac, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/093,790

(22) Filed: Nov. 10, 2020

(65) Prior Publication Data

US 2022/0145771 A1    May 12, 2022

(51) Int. Cl.
*F01D 17/16*    (2006.01)
*F01D 9/04*    (2006.01)
*F02C 9/20*    (2006.01)
*F04D 29/56*    (2006.01)

(52) U.S. Cl.
CPC ..........  *F01D 17/162* (2013.01); *F01D 9/041* (2013.01); *F02C 9/20* (2013.01); *F04D 29/563* (2013.01); *F05D 2240/128* (2013.01); *F05D 2240/54* (2013.01); *F05D 2260/36* (2013.01)

(58) Field of Classification Search
CPC .......... F01D 17/10; F01D 17/14; F01D 17/16; F01D 17/162; F01D 9/00; F01D 9/02; F01D 9/04; F01D 9/041; F02C 9/20; F04D 29/56; F04D 29/563; F05D 2260/36; F05D 2240/128; F05D 2240/54; F05D 2240/80; F05D 2240/91; F05D 2230/64; F05D 2230/70; Y10T 403/7047; B23P 19/088; B23P 15/00; B23P 15/008; B23P 15/04; B23P 15/06
See application file for complete search history.

(56) References Cited

U.S. PATENT DOCUMENTS

| | | | | |
|---|---|---|---|---|
| 4,078,638 A | * | 3/1978 | Koyama | F16F 9/063 188/288 |
| 6,464,457 B1 | * | 10/2002 | Morgan | F01D 11/005 277/630 |
| 2008/0219832 A1 | * | 9/2008 | Major | F01D 17/162 415/65 |

(Continued)

*Primary Examiner* — Woody A Lee, Jr.
*Assistant Examiner* — Elton K Wong
(74) *Attorney, Agent, or Firm* — Norton Rose Fulbright Canada LLP (57) ABSTRACT

A variable guide vane (VGV) assembly, has: vanes distributed about a central axis, each of the vanes having an airfoil extending between first and second stems, the vanes rotatable about vane axes extending between the first and second stems; and a bushing ring supporting the first stems of the vanes, the bushing ring defining circumferentially distributed pockets receiving the first stems of the vanes, the bushing ring having a first ring body extending circumferentially around the central axis, a second ring body extending circumferentially around the central axis and removably secured to the first ring body, the second ring body defining at least one tab projecting axially to axially overlap at least a portion of the first ring body and defining a contact plane therebetween, and at least one locking member extending radially through the contact plane to removably secure the first ring body and the second ring body together.

16 Claims, 3 Drawing Sheets

(56) References Cited

U.S. PATENT DOCUMENTS

| | | | | |
|---|---|---|---|---|
| 2015/0192025 A1* | 7/2015 | Boeck | .................... | F04D 29/563 |
| | | | | 415/173.7 |
| 2016/0123188 A1* | 5/2016 | Maliniak | ............... | F01D 25/243 |
| | | | | 415/209.4 |
| 2016/0146027 A1* | 5/2016 | Humhauser | ............. | F01D 9/042 |
| | | | | 415/148 |
| 2016/0363133 A1* | 12/2016 | Mouton | ................ | F04D 29/563 |
| 2017/0159470 A1* | 6/2017 | Albers | ................. | F01D 11/005 |
| 2017/0159471 A1 | 6/2017 | Albers et al. | | |
| 2017/0363100 A1* | 12/2017 | Ulrichsohn | ........... | F04D 29/023 |
| 2018/0119616 A1* | 5/2018 | Scott | ........................ | F02C 7/04 |
| 2019/0301295 A1* | 10/2019 | Hernandez | ............. | F01D 5/066 |

\* cited by examiner

VARIABLE GUIDE VANE ASSEMBLY AND BUSHING RING THEREFOR

TECHNICAL FIELD

The disclosure relates generally to gas turbine engines, and more particularly to variable guide vane assemblies for a compressor section of a gas turbine engine.

BACKGROUND

Within the compressor of a gas turbine engine, air is channeled through circumferential rows of vanes and blades that pressurize the air in stages. Variable guide vanes ("VGV" or "VGVs") are sometimes used within compressors, and provide vanes which are rotatable such that the angle of attack they define with the incoming flow may be varied. Improvements with such variable guide vane assemblies is sought.

SUMMARY

In one aspect, there is provided a variable guide vane (VGV) assembly for a gas turbine engine, comprising: variable guide vanes circumferentially distributed about a central axis, each of the variable guide vanes having an airfoil extending between first and second stems at respective first and second radial ends of the airfoil, the variable guide vanes rotatable about respective vane axes extending between the first and second stems; and a bushing ring supporting the first stems of the variable guide vanes, the bushing ring defining circumferentially distributed pockets receiving the first stems of the variable guide vanes, the bushing ring having a first ring body extending circumferentially around the central axis, a second ring body extending circumferentially around the central axis and removably secured to the first ring body, the second ring body defining at least one tab projecting axially to axially overlap at least a portion of the first ring body and defining a contact plane therebetween, and at least one locking member extending radially through the contact plane to removably secure the first ring body and the second ring body together.

In some embodiments, the at least one locking member protrudes from the at least one tab of the second ring body and mates with at least one corresponding recess defined in the first ring body, the at least one recess extending from a face of the first ring body defining the contact plane in a direction having a radial component relative to the central axis.

In some embodiments, the busing ring is made of a composite material.

In some embodiments, peripheral surfaces of the pockets are in direct contact with the stems.

In some embodiments, the at least one tab is elastically deflectable in a radial direction relative to the central axis, the first ring body engaged to the second ring body in a snap fit connection once the at least one locking member is in register with the at least one recess of the first ring body and wherein the at least one locking member is engaged into the at least one recess.

In some embodiments, the at least one locking member includes bulges protruding from distal ends of a plurality of tabs of the at least one tab.

In some embodiments, the first ring body defines tab-receiving recesses circumferentially distributed around the central axis and extending from a radially inner face of the first ring body toward a radially outer face of the first ring body, the tab-receiving recesses sized to receive the plurality of tabs such that radially inner faces of the plurality of tabs are radially aligned with the radially inner face of the first ring body.

In some embodiments, the bulges and the plurality of tabs are monolithic with the second ring body.

In some embodiments, the at least one locking member includes pins secured within registering apertures defined through the at least one tab of the second ring body and through the first ring body.

In some embodiments, the at least one tab includes a plurality of tabs, the first ring body defines tab-receiving recesses extending radially from a radially inner face of the first ring body toward a radially outer face of the first ring body, the tab-receiving recesses sized to receive the plurality of tabs such that radially inner faces of the tabs are radially aligned with the radially inner face of the first ring body.

In some embodiments, the first ring body defines at least one bore circumferentially aligned with the at least one locking member, the at least one bore sized to receive a tool to disengage the at least one locking member.

In another aspect, there is provided a gas turbine engine, comprising: a compressor section having a first casing and a second casing extending around a central axis, an annular gaspath between the first casing and the second casing, the compressor section having stators and rotors, at least one of the stators having vanes circumferentially distributed about the central axis and each pivotable about a respective vane axis extending between vane stems, the vanes having airfoils extending across the annular gaspath between the vane stems, and a bushing ring secured to the first casing, the bushing ring defining pockets receiving the vane stems, peripheral surfaces of the pockets in direct contact with the vane stems, the bushing ring having first and second ring bodies extending circumferentially around the central axis and axially overlapping one another, and means for securing together the first and second ring bodies.

In some embodiments, the busing ring is made of a composite material.

In some embodiments, the second ring body defines at least one tab, the at least one tab axially overlapping the first ring body.

In some embodiments, the at least one tab is located radially inwardly of the first ring body relative to the central axis.

In some embodiments, the at least one tab includes a plurality of tabs circumferentially distributed around the central axis, the first ring body defining tab-receiving recesses circumferentially distributed around the central axis and extending radially from a radially inner face of the first ring body toward a radially outer face of the first ring body, the tab-receiving recesses sized to receive the plurality of tabs such that radially inner faces of the plurality of tabs are radially aligned with the radially inner face of the first ring body.

In some embodiments, the means include bulges protruding in a direction having a radial component from the plurality of tabs, the plurality tabs being elastically deflectable in a radial direction relative to the central axis, the first ring body engaged to the second ring body in a snap fit connection once the bulges of the plurality of tabs are in register with bulge-receiving recesses of the first ring body and wherein the bulges are engaged into the bulge-receiving recesses.

In some embodiments, the means include at least one pin secured within registering apertures defined through both of the at least one tab and the first ring body.

In yet another aspect, there is provided a bushing ring for supporting variable guide vanes of a gas turbine engine, comprising: a first ring body extending circumferentially around a central axis; a second ring body extending circumferentially around a central axis, one or both of the first ring body and the second ring body defining pockets sized for receiving stems of the vanes, the second ring body defining at least one tab axially overlapping the first ring body; and at least one protrusion secured to and extending at least radially beyond the at least one tab, the at least one protrusion extending in a direction having a radial component relative to the central axis from the at least one tab and into at least one recess defined by the first ring body.

In some embodiments, the at least one protrusion corresponds to: bulges protruding from a plurality of tabs of the at least one tab, the plurality of tabs being elastically deflectable in a radial direction relative to the central axis, the first ring body engaged to the second ring body in a snap fit connection once the bulges are in register with a plurality of recesses of the at least one recess of the first ring body, or pins press-fitted into the at least one recess and an aperture defined through the at least one tab.

DESCRIPTION OF THE DRAWINGS

Reference is now made to the accompanying figures in which.

DETAILED DESCRIPTION

The following disclosure relates generally to gas turbine engines, and more particularly to assemblies including one or more struts and variable orientation guide vanes as may be present in a compressor section of a gas turbine engine. In some embodiments, the assemblies and methods disclosed herein may promote better performance of gas turbine engines, such as by improving flow conditions in the compressor section in some operating conditions, improving the operable range of the compressor, reducing energy losses and aerodynamic loading on rotors.

Figure 1:
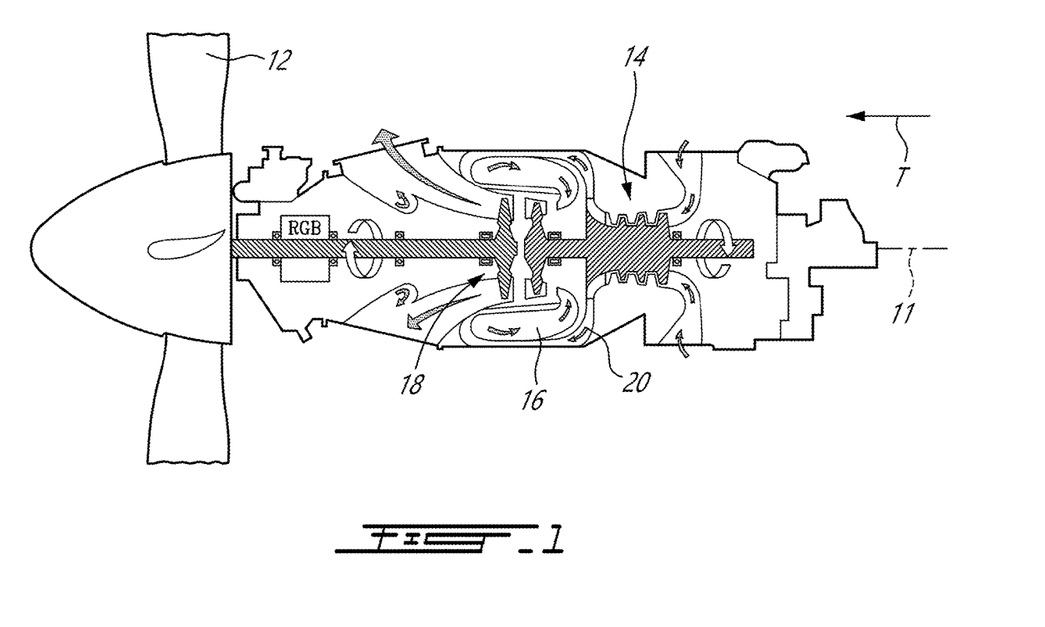
FIG. 1 is a schematic cross sectional view of a gas turbine engine.

FIG. 1 illustrates a gas turbine engine 10 (in this case, a turboprop) of a type preferably provided for use in subsonic flight, and in driving engagement with a rotatable load, which is depicted as a propeller 12. The gas turbine engine has in serial flow communication a compressor section 14 for pressurizing the air, a combustor 16 in which the compressed air is mixed with fuel and ignited for generating an annular stream of hot combustion gases, and a turbine section 18 for extracting energy from the combustion gases.

It should be noted that the terms "upstream" and "downstream" used herein refer to the direction of an air/gas flow passing through an annular gaspath 20 of the gas turbine engine 10. It should also be noted that the term "axial", "radial", "angular" and "circumferential" are used with respect to a central axis 11 of the gaspath 20, which may also be a central axis of gas turbine engine 10. The gas turbine engine 10 is depicted as a reverse-flow engine in which the air flows in the annular gaspath 20 from a rear of the engine 10 to a front of the engine 10, relative to a direction of travel T of the engine 10. This is opposite than a through-flow engine in which the air flows within the gaspath in a direction opposite the direction of travel T, from the front of the engine towards the rear of the engine 10. The principles of the present disclosure can be applied to both reverse-flow and through-flow engines and to any other gas turbine engines, such as a turbofan engine and a turboprop engine.

Figure 2:
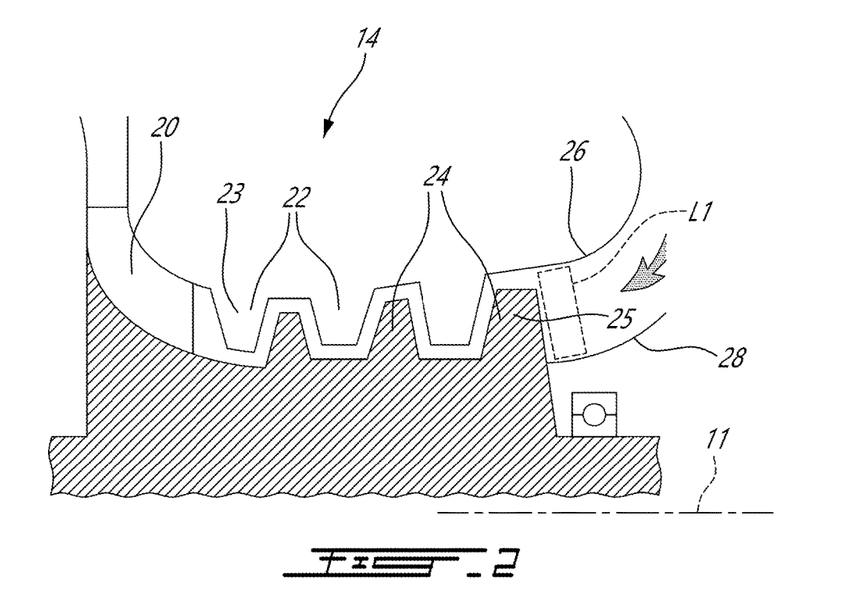
FIG. 2 is an enlarged view of a portion of FIG. 1.

Referring now to FIG. 2, an enlarged view of a portion of the compressor section 14 is shown. The compressor section 14 includes a plurality of stages, namely three in the embodiment shown although more or less than three stages is contemplated, each stage including a stator 22 and a rotor 24. The rotors 24 are rotatable relative to the stators 22 about the central axis 11. Each of the stators 22 includes a plurality of vanes 23 circumferentially distributed about the central axis 11 and extending into the gaspath 20. Each of the rotors 24 also includes a plurality of blades 25 circumferentially distributed around the central axis 11 and extending into the gaspath 20, the rotors 24 and thus the blades 25 thereof rotating about the central axis 11. As will be seen in further detail below, at least one of the stators 22 includes vanes 23 which are variable guide vanes (VGVs) and thus includes a variable guide vane assembly 40 as will be described.

In the depicted embodiment, the gaspath 20 is defined radially between an outer wall or casing 26 and an inner wall or casing 28. The vanes 23 and the blades 25 extend radially relative to the central axis 11 between the outer and inner casings 26, 28. "Extending radially" as used herein does not necessarily imply extending perfectly radially along a ray perfectly perpendicular to the central axis 11, but is intended to encompass a direction of extension that has a radial component relative to the central axis 11. The vanes 23 can be fixed orientation or variable orientation guide vanes (referred hereinafter as VGVs). Examples of rotors include fans, compressor rotors (e.g. impellers), and turbine rotors (e.g. those downstream of the combustion chamber).

Figure 3:
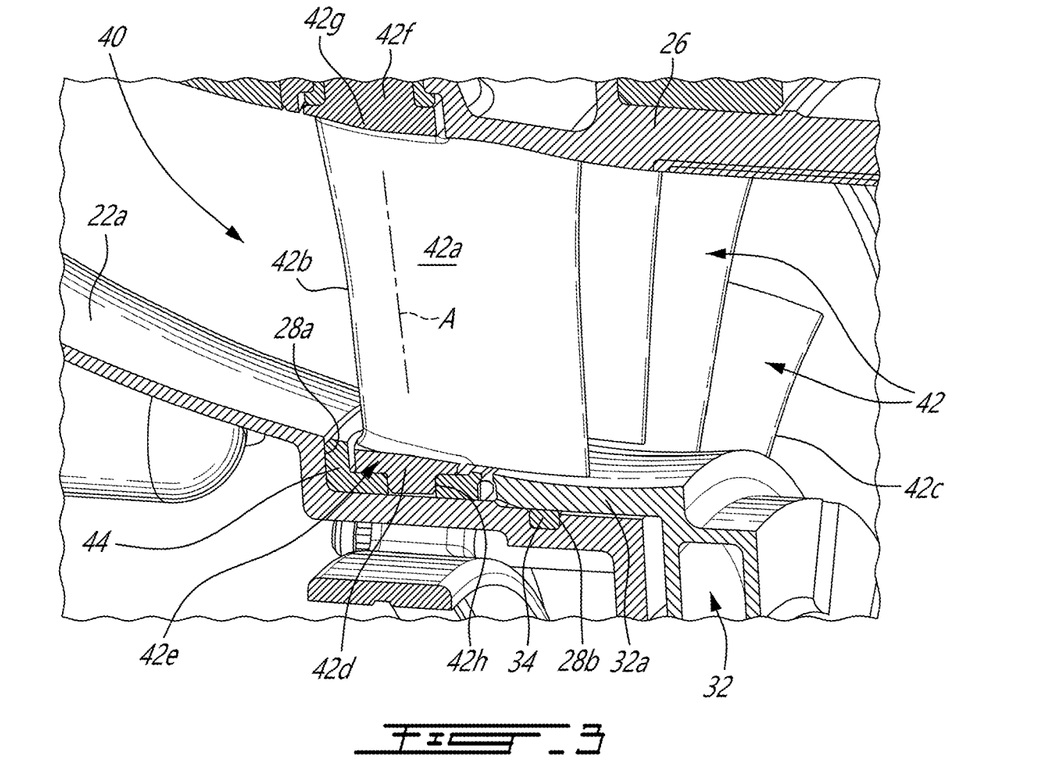
FIG. 3 is a three dimensional cutaway view of a variable guide vane (VGV) assembly in accordance with one embodiment that is part of the engine of FIG. 1.

Referring to FIG. 3, an example of a variable guide vane (VGV) assembly of a stator 22 of the engine 10 is shown at 40. Any of the stators 22 of the compressor section 14 depicted in FIG. 2 may be embodied as a variable guide vane 40. It will be appreciated that, in some cases, the VGV assembly 40 may be used as a stator of the turbine section 18 of the engine 10 without departing from the scope of the present disclosure. The VGV assembly 40 may be located at an upstream most location L1 (FIG. 2) of the compressor section 14. That is, the VGV assembly 40 may be a variable inlet guide vane assembly.

The VGV assembly 40 includes a plurality of vanes 42 circumferentially distributed about the central axis 11 and extending radially between the inner casing 28 and the outer casing 26. In the present embodiment, the vanes 42 are rotatably supported at both of their ends by the inner and outer casings 28, 26. Particularly, each of the vanes 42 has an airfoil 42a having a leading edge 42b and a trailing edge 42c both extending along a span of the airfoil 42a. Each of the vanes 42 has an inner stem, also referred to as an inner shaft portion, 42d secured to an inner end 42e of the airfoil 42a and an outer stem, also referred to as an outer shaft portion, 42f secured to an outer end 42g of the airfoil 42a.

In the embodiment shown, at least the inner stem 42d is rotatably engaged within a bushing ring 44. The bushing ring 44 extends circumferentially around the central axis 11 and defines a portion of a gaspath surface 22a of the annular gaspath 22. The bushing ring 44 is located axially between a shoulder 28a defined by the inner casing 28 and a wall 32a of a seal housing 32, which is secured to the inner casing 28. The wall 32 defines another portion of the gaspath surface 22a of the annular gaspath 22 and axially overlaps a portion of the inner casing 28. In other words, the gaspath surface 22a of the annular gaspath 22 is defined conjointly by the inner casing 28, the bushing ring 44, and the wall 32a of the seal housing 32. A sealing member 34 is located within a groove 28b defined by the inner casing 28. The sealing member 34 is biased radially between the wall 32a of the seal housing 32 and the inner casing 28. Any suitable sealing member, such as an O-ring, may be used.

The outer stem 42f of the vanes 42 may be engaged by a unison ring and the unison ring may be engaged by an actuator such that powering the actuator results in each of the vanes 42 rotating about their respective pivot axes A to change an angle of attack defined between the vanes 42 and a flow in the annular gaspath 22. Examples of system to rotate the vanes 42 are described in U.S. patent application Ser. No. 16/543,897 filed on Aug. 19, 2019 and Ser. No. 16/885,846 filed on May 28, 2020, the entire contents of which are incorporated herein by reference.

In some cases, typical bushing rings are made from two titanium parts as a machined set. The two parts are secured together using fasteners, such as bolts. Such a bushing ring may require the use of separate bushings to house the vane inner stems 42d to limit metal on metal contact between the inner stems 42d and bushing ring made of titanium. Moreover, the fasteners and bushings increase part count, weight and overall size of the assembly.

Figure 4:
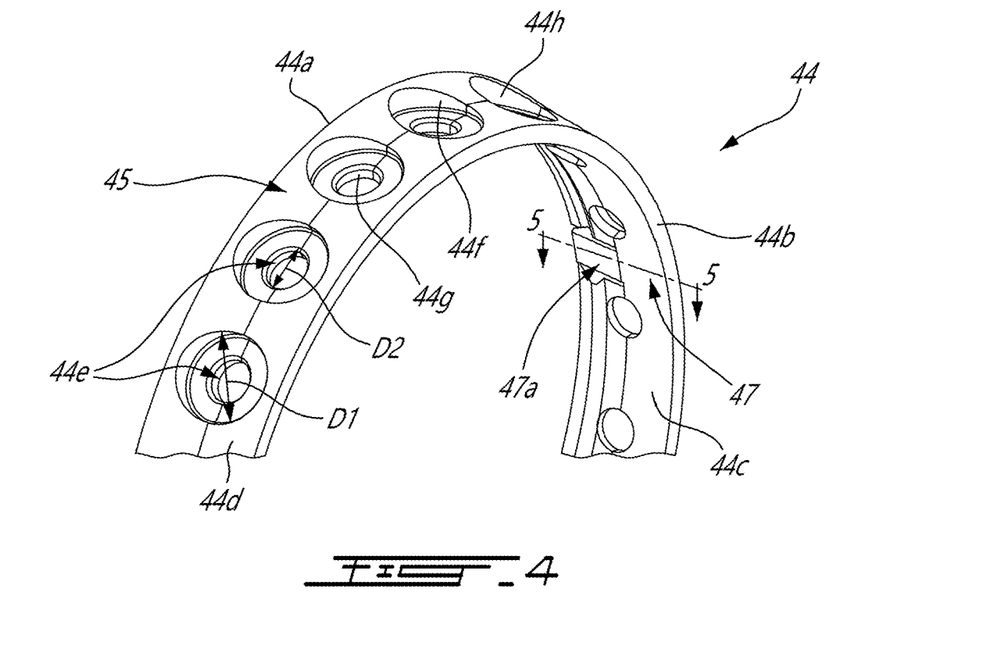
FIG. 4 is a three dimensional view of a bushing ring of the VGV assembly of FIG. 3.

Referring now to FIG. 4, the bushing ring 44 of the present disclosure may at least partially alleviate the aforementioned drawbacks. The bushing ring 44 secures the inner stems 42d of the vanes 42, also referred to as stems, in place. In some embodiments of engines, assembly constraints or limited space available require the bushing ring 44 to be made as two separate components, and joined together in the engine during assembly.

In the embodiment shown, the bushing ring 44 includes a first ring body 45 and a second ring body 47 securable to the first ring body 45. In the embodiment shown, the first and second ring bodies 45, 47 are sized to house the inner stems 42d of the vanes 42 and are sized to fit axially between the inner casing 28 and the seal housing 32. Particularly, the disclosed bushing ring 44 is received axially between an inter-compressor case portion of the inner casing 28 and the seal housing 32. It will be appreciated that the bushing 44 may be located at any suitable location and may be used to house the outer stems 42f.

In the embodiment shown, the busing ring 44 includes a first axial face 44a defined by the first ring body 45, a second axial face 44b opposed the first axial face 44a and defined by the second ring body 47, a radially inner face 44c defined by both of the first and second ring bodies 45, 47 and oriented toward the central axis 11, and a radially outer face 44d defined by both of the first and second ring body bodies 45, 47 and oriented away from the central axis 11. Both of the radially inner and radially outer faces 44c, 44d of the bushing ring 44 extends axially from the first axial face 44a to the second axial face 44b. The radially outer face 44d has a shape configured to bridge a gap between the inner casing 28 and the wall 32a of the seal housing 32. In other words, the radially outer face 44d defines a portion of the gaspath surface 22a of the gaspath 22 of the engine 10.

Still referring to FIG. 4, the bushing ring 44 defines a plurality of pockets 44e circumferentially distributed about the central axis 11 of the engine 10. Each of these pockets 44a includes a first pocket portion 44f having a first diameter D1 and extending from the radially outer face 44d toward the radially inner face 44c, and a second pocket portion 44g having a second diameter D2 less than the first diameter D1 and extending from the first pocket portion 44f to the radially inner face 44c. Each of the first and second pocket portions 44f, 44g are sized to receive respective portions of the inner stems 42d of the vanes 42. In the present embodiment, peripheral surfaces 42h of the inner stems 42d of the vanes 42 are in direct contact with peripheral surfaces 44h of the ring 44 that define the pockets 44e. Each of these peripheral surfaces 44h of the pockets 44e extends circumferentially around respective vane pivot axis A (FIG. 3) of the vanes 42. Using the disclosed bushing ring 44 may allow the omission of separate bushings disposed around each of the inner stems 42d of the vanes 42. This may reduce part count and weight.

In the embodiment shown, the first and second ring bodies 45, 47 are made by compression molded composite. The first and second ring bodies 45, 47 may be then machined as a set to create the vane pockets 44e and a surface defining a portion of the gaspath surface 22a of the gaspath 22. Manufacturing the bushing ring 44 in this sequence may ensure that each set of parts has acceptable tolerance. Moreover, having the bushing ring 44 made of a composite, such as but not limited to a compression molded composite for example, may allow avoiding the use of the separate bushings. It is understood that any suitable composite material may be used as long as it is able to withstand the environmental conditions in which it will be used. Using a composite material may eliminate the issue of having non-lubricated metal on metal contacts. This may improve durability.

As illustrated in FIG. 4, each of the first and second ring bodies 45, 47 define a portion (e.g., half) of the circumference of the pockets 44e. That is, the peripheral surfaces 44h extending around the pockets 44e are conjointly defined by the first ring body 45 and by the second ring body 47. Each of the first and second pocket portions 44f, 44g is defined concurrently by the first ring body 45 and by the second ring body 47. In the embodiment shown, having the first and second pocket portions 44f, 44g defined concurrently by the first and second bodies 45, 47 allows to sandwich the vane stems 42 between the first and second ring bodies 45, 47 from opposite sides of the vanes 42. In other words, during the assembly process, the two ring bodies 45, 47 are located on opposite sides of the vanes 42 and moved axially toward one another until the vane stems 42d are encased between the two ring bodies 45, 47, within their respective pockets 44e.

Figure 5:
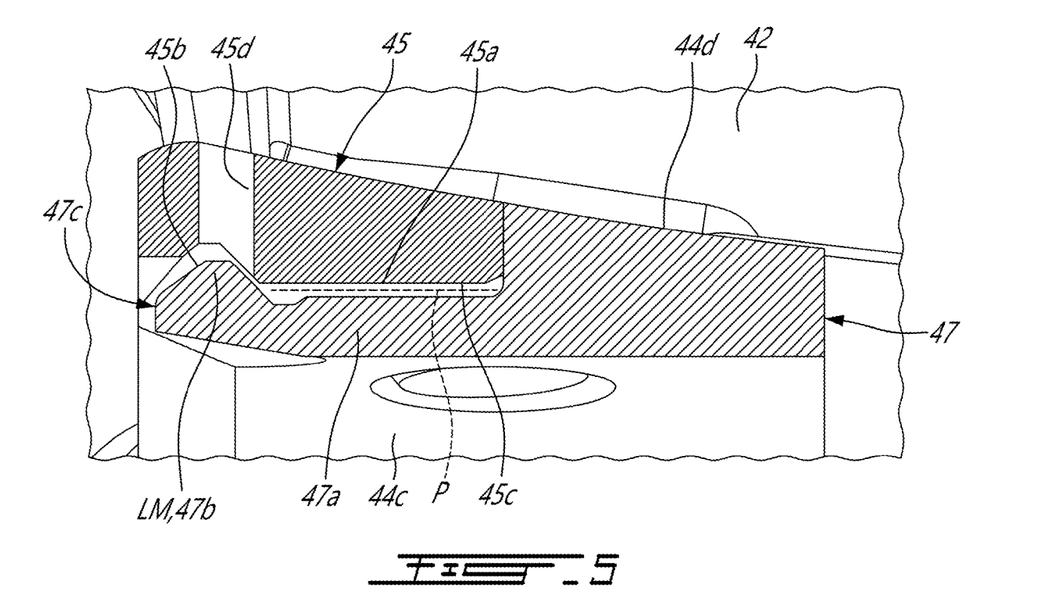
FIG. 5 is a cutaway view of the bushing ring of FIG. 4 taken along line 5-5 on FIG. 4.

Referring now to FIGS. 4-5, a cutaway view of the bushing ring 44 taken along line 5-5 on FIG. 4 is illustrated in FIG. 5. The two ring bodies 45, 47 are secured to one another. In the embodiment shown, the second ring body 47 defines tabs 47a circumferentially distributed around the central axis 11. Although only one tab 47a is illustrated in FIGS. 4-5, more than one (e.g., two, three, four in the present case) tab 47a are used to secure the two ring bodies 45, 47 together. It will be appreciated that any suitable number of tabs may be used without departing from the scope of the present disclosure. In a particular embodiment, the tabs are equidistantly spaced from one another and thus equally circumferentially spaced apart (e.g. 2 tabs spaced apart by 180 degrees, 3 tabs spaced apart by 120 degrees, 4 tabs spaced apart by 90 degrees, etc.) In another particular embodiment, only one annular tab extending circumferentially around the central axis 11 is used, the single tab extending about the full circumference of the bushing ring or at least extending about a majority of the circumference of the bushing ring. Each of the tabs 47a may be located circumferentially between two adjacent ones of the pockets 44e. It will be appreciated that a "tab" as used in the present disclosure may be any structural element that allows an axial overlap between the two ring bodies 45, 47. For instance, the tab may be a tenon, a dowel, or a flange. Additionally, the tab or tabs 47a extending from one of the ring bodies may axially overlap the other of the ring bodies either on a radially inner or a radially outer side thereof.

Figure 6:
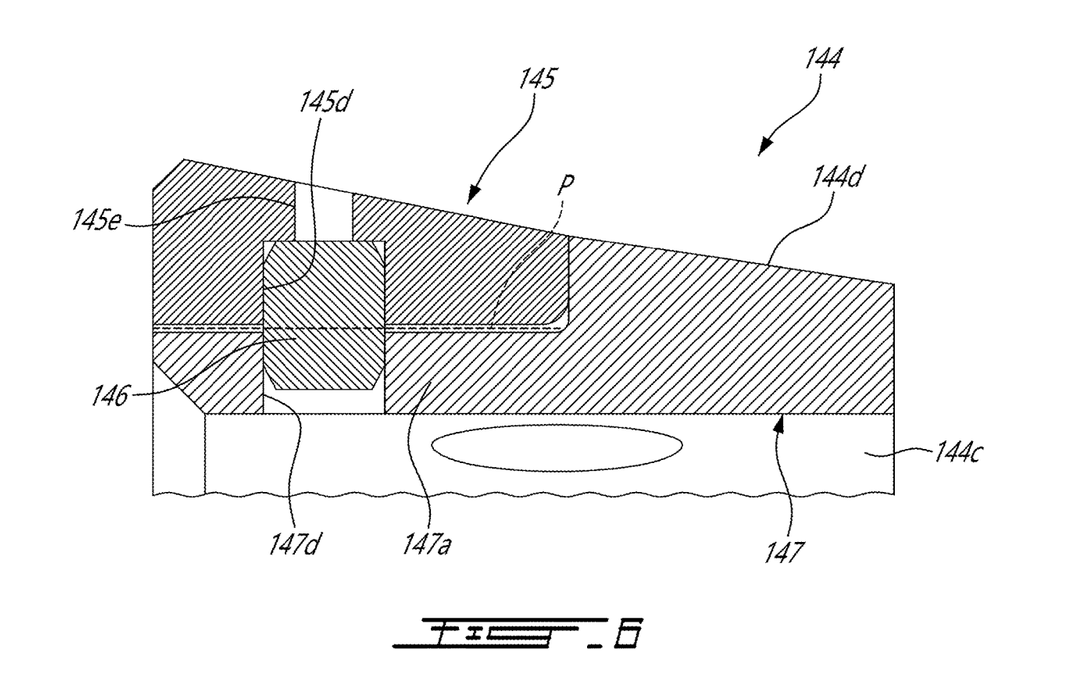
FIG. 6 is a cutaway view of a bushing ring for the VGV assembly of FIG. 3 in accordance with another embodiment.

The first ring body 45 and the second ring body 47 mutually axially overlap each other, and are thus radially constrained by one another via the tabs 47a. The tabs 47a which extend axially from the second ring body 45 axially overlap at least a portion of, or in the depicted embodiment the entirety of, the first ring body 45. In the embodiment shown, the tabs 47a of the second ring body 47 are located radially inwardly of the first ring body 45 relative to the central axis. Alternatively, the tabs 47a of the second ring body 47 may be located radially outwardly of the first ring body 45. The tabs 47a of the second ring body 47 and the mating flange of the first ring body 45 accordingly create a joint between the two ring bodies 45, 47 Which defines at least an axially extending contact plane P disposed radially between the outer and inner circumferentially extending surfaces of the first and second ring bodies 45, 47 when mated together, when viewed in cross-section as shown in FIGS. 5 and 6. In a particular embodiment, including those of FIGS. 5 and 6, this joint forms a lap joint.

In the embodiment illustrated, one or more locking members LM provide a releasable axial retention of the two ring bodies 45, 47, such that the two ring bodies can detachably secured to one another. The locking members LM extend or protrude substantially radially relative to the tabs 47a and thus extend in a direction having a radial component relative to the central axis 11. The locking members LM accordingly extend radially through the above-mentioned joint, and more specifically through the axially extending plane P defined at the joint, such as to removably secure (or more precisely axially retain) the two ring bodies together. The locking members may also be referred to herein as protrusions or projections, and may be integrally formed with either the tabs 47a of the second ring body 47 or a portion of the first ring body 45, or the locking members may alternately be separately formed (such as the pins 147 described below) from the first and second ring bodies and used to releasably fasten to two ring bodies together. In the embodiment shown, the locking members LM include detents or bulges or protrusions 47b which may, in one particular embodiment, be located at distal ends 47c of the tabs 47a. In an alternate embodiment, however, the protrusions 47b are located more inwardly, away from the distal end 47c of the tabs 47a and thus closer to the junction between the tabs 47a and the remainder of the second ring body 47. The protrusions 47b protrudes radially away from a remainder of the tabs 47a toward the first ring body 45. In the depicted embodiment, the bulges 47b and the tabs 47a are monolithic with the second ring body 47.

Referring more particularly to FIG. 5, the first ring body 45 defines tab-receiving recesses 45a that are circumferentially distributed around the central axis 11. Each of the tab-receiving recesses 45a is sized to receive therein a respective one of the tabs 47a. The tab-receiving recesses 45a extend from the radially inner face 44c of the bushing ring 44 toward the radially outer face 44d of the bushing ring 44. Each of the bulges 47b is sized to be received within and engage a respective one of bulge-receiving recesses 45b of the first ring body 45 to lock the two ring bodies 45, 47 together. In the embodiment shown, the bulge-receiving recesses 45b extend from the tab-receiving recesses 45a toward the radially outer face 44d of the bushing ring 44. Once the first and second ring bodies 45, 47 are engaged to one another, the bulges 47b of the tabs 47a are received within and engage the bulge-receiving recesses 45b of the first ring body 45. In the embodiment shown, a radial depth of the tab-receiving recesses 45a is such that a radially inner face of the tabs 47a is radially aligned with the radially inner face 44c of the bushing ring. In other words, a portion of the radially inner face 44c of the bushing ring 44 is defined by the tabs 47a. The tab-receiving recesses may be apertures, grooves, slots, or mortises.

The locking members LM are secured to and protrude from the tabs 47a of the second ring body 47. The first ring body 45 is secured to the second ring body 47 via the locking members LM engaging the bulge-receiving recesses 45b defined in the first ring body 45. As shown in FIG. 5, the bulge-receiving recesses 45b extend from a face of the first ring body 45 in a direction having a radial component relative to the central axis 11. In the present case, the face from which the bulge-receiving recesses 45b extend is one of the faces that define the tab-receiving recesses 45a. It will be appreciated that, is some embodiments, the tab-receiving recesses 45a may be avoided. In some embodiments, only a single bulge-receiving recess may extend circumferentially all around the central axis 11. This may allow securing the first and second ring bodies 45, 47 at any suitable relative circumferential orientation.

The tabs 47a are elastically deflectable in a radial direction relative to the central axis 11 to allow the mating of the two ring bodies 45, 47. That is, to engage the two ring bodies 45, 47 together, the bulges 47b are placed in abutment against bottom surfaces 45c of the first ring body 45. The bottom surfaces 45c define radial boundaries of the tab-receiving recesses 45a of the first ring body 45. Then, the two ring bodies 45, 47 are moved one toward the other in an axial direction relative to the central axis 11. This has the effect of bending the tabs 47a toward the central axis 11 and away from the first ring body 45. When the bulges 47b become in register with the bulge-receiving recesses 45b, the bulges 47b snap in place into the bulge-receiving recesses 45b. The two ring bodies 45, 47 are therefore securable to one another via a "snap-fit" connection provided by the bulges 47b of the tabs 47a and the bulge-receiving recesses 45b of the first ring body 45. As shown in FIG. 5, when the two ring bodies 45, 47 are secured to one another via the engagement of the bulges 47b into the bulge-receiving recesses 45b, the first ring body 45 is in abutment against a shoulder defined by the second ring body 47; the tabs 47a protrude axially from the shoulder.

As shown in FIG. 5, bores 45d are defined by the first ring body 45. The bores 45d extend in a direction having a radial component relative to the central axis 11 from the radially outer face 44d of the bushing ring 44 and open to the bulge-receiving recesses 45b. The bores 45d are sized to receive a tool used to push the bulges 47b such as to disengage the bulges 47b from the bulge-receiving recesses 45b to separate the two ring bodies 45, 47 when required.

Referring now to FIG. 6, an alternate embodiment of a bushing ring is shown at 144. For the sake of conciseness, only elements that differ from the bushing ring 44 of FIGS. 4-5 are described below. The bushing ring 144 includes first and second ring bodies 145, 147. The second ring body 147 define tabs 147a that axially overlap the first ring body 145.

The first ring body 145 define recesses in the form of apertures 145d. The tabs 147a of the second ring body 147 defines apertures 147d. The apertures 145d of the first ring body 145 are in register with the apertures 147d defined through the tabs 147a when the two ring bodies 145, 147 are assembled together. It will be appreciated that, in an alternative embodiment, the second ring body 147 may define a single tab 147a. The single tab 147 may be fully annular. The first ring body may define a single tab-receiving recess.

In the embodiment shown, the locking members are radial pins 146. That is, once the apertures 145d of the first ring body 145 are in register with the apertures 147 of the tabs 147a of the second ring body 147, the radial pins 146 may be inserted into both of the apertures 145d, 147d of both of the first ring body 145 and the tabs 147a of the second ring body 147. The radial pins 146 are inserted in a direction having a radial component relative to the central axis 11. In the embodiment shown, the pins 146 are inserted via the radially inner face 144c of the bushing ring 144. The apertures 147d defined through the tabs 147a extend in a direction having a radial component from the radially inner face 144c and extend through a whole radial thickness of the tabs 147a. The pins 146 may be press-fitted into the apertures 145d, 147d of the first ring body 145 and the tabs 147a of the second ring body 147. As shown in FIG. 6, the radial pins 146 are inserted deep enough so that they do not protrude radially inwardly from the radially inner face 144c of the busing ring 144.

Bores 145e are defined by the first ring body 145. The bores 145e extend in a direction having a radial component relative to the central axis 11 from the radially outer face 144d of the bushing ring 144 and open to the apertures 145d. The bores 145e are sized to receive a tool used to push the radial pins 146 out of the apertures 145d, 147d to separate the two ring bodies 45, 47 when required.

It will be appreciated that other means may be used to secure the first ring body to the second ring body. These means may include, for instance, interlocking tenon and mortise joints, dowels, keyway. A dog bone or bowtie connection between the two ring bodies may alternatively be used. The dog bone or bowtie may be inserted from the inner diameter.

Referring to all figures, for assembling the bushing ring 44, 144, the first ring body 45, 145 and the second ring body 47, 147 of the bushing ring 44, 144 are obtained; the first ring body 45, 145 is engaged with the second ring body 47, 147 by overlapping tabs 47a, 147a of the second ring body 47, 147 with the first ring body 45, 145; and the first ring body 45, 145 is secured to the second ring body 47, 147 with locking members LM securing the tabs 47a, 147a to the first ring body 45, 145.

As shown in FIG. 5, the first ring body 45 is secured to the second ring body 47 by deforming the tabs 47a in a radial direction away from the first ring body 45 until the bulges 47b become in register with the bulge-receiving recesses 45b defined by the first ring body 45 and snap into the recesses 45b for engaging the bulges 47b into the bulge-receiving recesses 45b. The bulges 47b may be biased into the bulge-receiving recesses 45b via the tabs 47a.

As show in FIG. 6, the first ring body 145 is secured to the second ring body 147 by inserting the pins 146 into the registering apertures 145d, 147d defined through both of the first ring body 145 and the tabs 147a of the second ring body 147.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, any of the stators (fan stator, compressor stator, and turbine stator) of the gas turbine engine may use the bushing rings disclosed herein. Yet further modifications could be implemented by a person of ordinary skill in the art in view of the present disclosure, which modifications would be within the scope of the present technology.

The invention claimed is:

1. A variable guide vane (VGV) assembly for a gas turbine engine, comprising:
   variable guide vanes circumferentially distributed about a central axis, each of the variable guide vanes having an airfoil extending between first and second stems at respective first and second radial ends of the airfoil, the variable guide vanes rotatable about respective vane axes extending between the first and second stems; and
   a bushing ring supporting the first stems of the variable guide vanes, the bushing ring defining circumferentially distributed pockets receiving the first stems of the variable guide vanes, the bushing ring having
      a first ring body extending circumferentially around the central axis,
      a second ring body extending circumferentially around the central axis and removably secured to the first ring body, the second ring body defining at least one tab projecting axially to axially overlap at least a portion of the first ring body and defining a contact plane therebetween, and
      a plurality of locking members extending radially through the contact plane to removably secure the first ring body and the second ring body together, the plurality of locking members being:
         bulges defined by a plurality of tabs of the at least one tab, the bulges received within at least one recess defined by the first ring body.

2. The VGV assembly of claim 1, wherein the at least one recess extends from a face of the first ring body defining the contact plane in a direction having a radial component relative to the central axis.

3. The VGV assembly of claim 2, wherein the at least one tab is elastically deflectable in a radial direction relative to the central axis, the first ring body engaged to the second ring body in a snap fit connection once the plurality of locking members are in register with the at least one recess of the first ring body and wherein the plurality of locking members are engaged into the at least one recess.

4. The VGV assembly of claim 3, wherein the first ring body defines tab-receiving recesses circumferentially distributed around the central axis and extending from a radially inner face of the first ring body toward a radially outer face of the first ring body, the tab-receiving recesses sized to receive the plurality of tabs such that radially inner faces of the plurality of tabs are radially aligned with the radially inner face of the first ring body.

5. The VGV assembly of claim 1, wherein the bushing ring is made of a composite material.

6. The VGV assembly of claim 1, wherein the VGV assembly is free of separate bushings between peripheral surfaces of the pockets and the first stems.

7. The VGV assembly of claim 1, wherein the bulges and the plurality of tabs are monolithic with the second ring body.

8. The VGV assembly of claim 1, wherein the first ring body defines tab-receiving recesses extending radially from a radially inner face of the first ring body toward a radially outer face of the first ring body, the tab-receiving recesses sized to receive the plurality of tabs such that radially inner faces of the tabs are radially aligned with the radially inner face of the first ring body.

9. The VGV assembly of claim 1, wherein the first ring body defines bores circumferentially aligned with the plurality of locking members, the bores sized to receive a tool to disengage the plurality of locking members.

10. A gas turbine engine, comprising:
a compressor section having a first casing and a second casing extending around a central axis, an annular gaspath between the first casing and the second casing, the compressor section having stators and rotors, at least one of the stators having
vanes circumferentially distributed about the central axis and each pivotable about a respective vane axis extending between first and second vane stems at opposed ends of the vanes, the vanes having airfoils extending across the annular gaspath between the first and second vane stems, and
a bushing ring secured to the first casing, the bushing ring defining pockets receiving the first vane stems, the pockets bounded by peripheral surfaces, direct contact interfaces defined between the peripheral surfaces of the pockets and the first vane stems, the bushing ring having first and second ring bodies extending circumferentially around the central axis and axially overlapping one another, and means for securing together the first and second ring bodies, the means being:
bulges defined by a plurality of tabs of the second ring body, the bulges received within at least one recess defined by the first ring body.

11. The gas turbine engine of claim 10, wherein the bushing ring is made of a composite material.

12. The gas turbine engine of claim 11, wherein the plurality of tabs are axially overlapping the first ring body.

13. The gas turbine engine of claim 12, wherein the plurality of tabs are located radially inwardly of the first ring body relative to the central axis.

14. The gas turbine engine of claim 13, wherein the first ring body defines tab-receiving recesses circumferentially distributed around the central axis and extending radially from a radially inner face of the first ring body toward a radially outer face of the first ring body, the tab-receiving recesses sized to receive the plurality of tabs such that radially inner faces of the plurality of tabs are radially aligned with the radially inner face of the first ring body.

15. The gas turbine engine of claim 14, wherein the bulges protrude in a direction having a radial component from the plurality of tabs, the plurality tabs being elastically deflectable in a radial direction relative to the central axis, the first ring body engaged to the second ring body in a snap fit connection once the bulges of the plurality of tabs are in register with bulge-receiving recesses of the first ring body and wherein the bulges are engaged into the bulge-receiving recesses.

16. A bushing ring for supporting variable guide vanes of a gas turbine engine, comprising:
a first ring body extending circumferentially around a central axis;
a second ring body extending circumferentially around the central axis, one or both of the first ring body and the second ring body defining pockets sized for receiving stems of the vanes, the second ring body defining at least one tab axially overlapping the first ring body; and
at least one protrusion secured to and extending at least radially beyond the at least one tab, the at least one protrusion extending in a direction having a radial component relative to the central axis from the at least one tab and into at least one recess defined by the first ring body,
the at least one protrusion corresponding to bulges protruding from a plurality of tabs of the at least one tab, the plurality of tabs circumferentially spaced apart from one another, the plurality of tabs being elastically deflectable in a radial direction relative to the central axis, the first ring body engaged to the second ring body in a snap fit connection once the bulges are in register with a plurality of recesses of the at least one recess of the first ring body.

* * * * *